United States Patent
Kamdar

(10) Patent No.: US 8,468,062 B1
(45) Date of Patent: Jun. 18, 2013

(54) MULTIPLE PARTY ORDER COORDINATION METHOD AND SYSTEM

(75) Inventor: Kiyanosh Kamdar, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 1069 days.

(21) Appl. No.: 12/110,832

(22) Filed: Apr. 28, 2008

(51) Int. Cl.
  *G06Q 30/00* (2012.01)
  *G06Q 30/06* (2006.01)

(52) U.S. Cl.
  CPC ............ *G06Q 30/0605* (2013.01)
  USPC ...... 705/26.2; 705/26.4; 705/26.81; 705/27.1

(58) Field of Classification Search
  CPC .................................. G06Q 30/0605
  USPC .................. 705/26, 26.2, 26.4, 27.1
  See application file for complete search history.

(56) References Cited

U.S. PATENT DOCUMENTS

| | | | |
|---|---|---|---|
| 7,480,627 B1 * | 1/2009 | Van Horn et al. | 705/26.2 |
| 7,680,696 B1 * | 3/2010 | Murray | 705/26.4 |
| 2003/0023514 A1 * | 1/2003 | Adler et al. | 705/26 |
| 2005/0091100 A1 * | 4/2005 | Riggs et al. | 705/8 |
| 2005/0177448 A1 * | 8/2005 | Fu et al. | 705/26 |
| 2006/0122895 A1 * | 6/2006 | Abraham et al. | 705/26 |
| 2009/0043671 A1 * | 2/2009 | Johansson et al. | 705/26 |
| 2009/0204673 A1 * | 8/2009 | Tian et al. | 709/204 |

* cited by examiner

*Primary Examiner* — Ryan Zeender
*Assistant Examiner* — Hunter Wilder
(74) *Attorney, Agent, or Firm* — McKay and Hodgson, LLP; Philip McKay; Sean P. Lewis

(57) ABSTRACT

A system and method for providing a multiple party order coordination system includes a process for providing a multiple party order coordination system whereby a given consumer, i.e., a first party, is provided the opportunity to try and combine one or more of the given consumer's product and/or service orders with one or more other consumers' product and/or service orders, i.e., with one or more other parties' product and/or service orders, into a combined multiple party order. A communication system is provided whereby the multiple parties can communicate, and/or negotiate, and/or coordinate, the merger/combination of their respective orders and establish one or more operating parameters such as, but not limited to, purchase dates, delivery dates, delivery locations, purchase price, and payment method and timing. The multiple parties' individual product and/or service orders are then merged into a single combined multiple party order that is then placed through one or more purchase systems provided by, or otherwise associated with, the process for providing a multiple party order coordination system.

32 Claims, 4 Drawing Sheets

300

ORDER SUMMARY

| | | | |
|---|---|---|---|
| 1 DOZEN OYSTERS | - | $16.00 | 301 |
| SHIPPING | | $36.00 | |
| TAX | | $ 2.00 | |
| TOTAL | | $54.00 | |

DISCOUNT NOTICE   303

THE SHIPPING ON THIS ITEM IS A FLAT COST
FOR UP TO 20 DOZEN UNITS

CONSEQUENTLY, A SUBSTANTIAL SAVINGS AND/OR
SHIPPING COSTS MAY BE AVAILABLE
TO YOU BY COMBINING YOUR ORDER WITH
SIMILAR ORDERS FROM CONSUMERS IN
YOUR AREA.

WOULD YOU LIKE TO ATTEMPT TO CREATE A COMBINED ORDER

YES  [X]                          NO THANKS  [ ]

Initiating Party Information

Name— Savannah McKay
Rating — 5 stars (201 reviews)
Contact: sjm@lovesoysters.com

401

Item Information

Item — oysters
Seller — Pacific Oyster Company
Price - $16.00/12
Minimum order 240
$0.15 shipping per oyster for 240
Commitments to date — 12

403

Delivery Information

Dates for delivery — June 15 to 20
Delivery location: within 5 miles of downtown Monterey, California

405

Comments:

My cutoff date is June 15,
if I do not have the 240 minimum
By June 15, the order will
NOT be placed

407

MULTIPLE PARTY ORDER COORDINATION METHOD AND SYSTEM

BACKGROUND

Many sellers of products and/or services provide significant discounts for "large orders", i.e., orders of a given product and/or service of a threshold quantity and/or orders of a threshold total price. These large order discounts vary from seller-to-seller in terms of both the amount of the discount and the form of the discount. Large order discounts are typically offered by both traditional "brick and mortar" sellers as well as "electronic commerce" sellers. However, large order discounts are particularly prevalent, and seem to be an even more important component, in the electronic commerce environment where overhead is typically minimal and inventory management is often the key to success.

As one example, many sellers of products and/or services have tiered and/or volume pricing based on the number of units ordered/purchased and/or the regularity of service orders. Typically the more units ordered and/or the more regular the service, the greater the discount. To a large degree, it is tiered pricing and volume discount structures that allow high volume discount stores, i.e., "big box" stores such as Wal-Mart, to offer such low prices to their customers. Consequently, it is these same tiered and volume pricing structures, as well as the other discounts discussed herein, that has made it very difficult, if not impossible, for smaller stores, i.e., local "Mom and Pop" stores, to compete with the high volume discount stores. As a result, in many cases, local stores are rapidly becoming a thing of the past and these potential sources of healthy competition and local economic stimulus are currently disappearing at an alarming rate.

As another example, some sellers of products and/or services provide explicit and/or effective shipping discounts, or even free shipping, for large orders. This is particularly true in the electronic commerce environment. For instance, in some cases the shipping discount is explicit in that larger orders are simply charged less shipping in terms of real shipping costs paid, or as noted, not paid. In other cases the shipping cost is a flat rate, regardless of order size, so that, in effect, larger orders are charged less for shipping on a percentage of cost basis. These shipping discounts can be quite significant, and for many items shipping can be 25% of more of the total cost. In addition, in cases of specialty products that require special packaging and/or handling, the explicit and/or effective shipping discounts for large orders can be even more significant.

As a specific illustrative example, a dozen fresh oysters ordered from a specialty dealer may cost $16.00 a dozen. However, in one example, to keep the oysters fresh for consumption upon delivery, they must be shipped overnight and be packed in Styrofoam with dry ice. Consequently, while the oysters may only cost $16.00 a dozen, the shipping is $36.00, or $3.00 an oyster. However, if ten dozen oysters were ordered, the same shipping cost of $36.00 is incurred so that the shipping cost per oyster drops to $0.30 per oyster, an effective saving of $2.70 per oyster.

In some cases, sellers also offer discounts to regular customers who buy their products on a periodic basis with a defined regularity and/or minimum amount being purchased in a given period of time. In addition, many sellers have minimum order requirements, again both in terms of cost and/or in terms of quantity. In these cases, a consumer desiring less than the minimum order amount is faced with the choice of either buying more of a product than he or she desires, thereby essentially paying more per desired unit, or forgoing the purchase all together.

While the large order discounts discussed above are often significant, and therefore highly desirable by all consumers, many consumers simply do not need or want the threshold quantities of a given product and/or service, and/or do not have the means to spend the threshold amount of money, required to receive the large order discounts. As a result, many consumers either forgo the purchases altogether or pay a premium for not being a high volume consumer. This is not only an unfortunate situation for the individual consumer, but the seller also loses potential business. In addition, as noted above, in some cases, the inability to obtain large order discounts can result in a relatively small business being unable to compete with the higher volume "big box" stores and, in many cases, being priced out of business altogether.

SUMMARY

In accordance with one embodiment, a system and method for providing a multiple party order coordination system includes a process for providing a multiple party order coordination system whereby a given consumer, i.e., a first party, is provided the opportunity to try and combine one or more of the given consumer's product and/or service orders with one or more other consumers' product and/or service orders, i.e., with one or more other parties' product and/or service orders, into a combined multiple party order. In one embodiment, a communication system is provided whereby the multiple parties can communicate, and/or negotiate, and/or coordinate, the merger/combination of their respective orders and establish one or more operating parameters such as, but not limited to, purchase dates, delivery dates, delivery locations, purchase price, and payment method and timing. In one embodiment, the multiple parties' individual product and/or service orders are then merged into a single combined multiple party order. In one embodiment, the combined multiple party order is then placed through one or more purchase systems provided by, or otherwise associated with, the process for providing a multiple party order coordination system.

In one embodiment, the given consumer is provided the opportunity to try and combine one or more of the given consumer's product and/or service orders with one or more other consumers' product and/or service order, through the process for providing a multiple party order coordination system. In one embodiment, the given consumer is provided the opportunity to try and combine one or more of the given consumer's product and/or service orders with one or more other consumers' product and/or service orders through a database associated with the process for providing a multiple party order coordination system. In one embodiment, the given consumer is provided the opportunity to try and combine one or more of the given consumer's product and/or service orders with one or more other consumers' product and/or service orders through a web-page and/or website associated with the process for providing a multiple party order coordination system. In one embodiment, the given consumer is provided the opportunity to try and combine one or more of the given consumer's product and/or service orders with one or more other consumers' product and/or service orders through an account associated with the given consumer and the process for providing a multiple party order coordination system.

In one embodiment, the given consumer is provided the opportunity to try and combine one or more of the given consumer's product and/or service orders with one or more other consumers' product and/or service orders through a seller of the subject product and/or service. In one embodiment, the given consumer is provided the opportunity to try and combine one or more of the given consumer's product and/or service orders with one or more other consumers' product and/or service orders through a web-page and/or website associated with a seller of the subject product and/or service. In one embodiment, the given consumer is provided the opportunity to try and combine one or more of the given consumer's product and/or service orders with one or more other consumers' product and/or service orders through a checkout feature and/or shopping cart and/or order summary page associated with a seller of the subject product and/or service.

In one embodiment, the given consumer is provided the opportunity to try and combine one or more of the given consumer's product and/or service orders with one or more other consumers' product and/or service orders through a given community of consumers, such as, but not limited to: consumers groups; users of websites and/or services specifically designed around a process for providing a multiple party order coordination system to bring consumers together for making purchases; users of web-sites and/or services including a process for providing a multiple party order coordination system as a feature and/or component of the website and/or service; a parent corporation or business entity; an Internet based community; a business and/or trade association; a chamber of commerce; or any other organization and/or community. In one embodiment, the given consumer is provided the opportunity to try and combine one or more of the given consumer's product and/or service orders with one or more other consumers' product and/or service orders through a database associated with a given community of consumers. In one embodiment, the given consumer is provided the opportunity to try and combine one or more of the given consumer's product and/or service orders with one or more other consumers' product and/or service orders through a web-page and/or website associated with a given community of consumers. In one embodiment, the given consumer is provided the opportunity to try and combine one or more of the given consumer's product and/or service orders with one or more other consumers' product and/or service orders through an account associated with the given consumer and a given community of consumers.

In one embodiment, the given consumer is provided the opportunity to try and combine one or more of the given consumer's product and/or service orders with one or more other consumers' product and/or service orders through any means, mechanism, process, and/or procedure for contacting and/or communicating with a given consumer, as discussed herein, and/or as known in the art at the time of filing, and/or as developed after the time of filing.

In one embodiment, when the given consumer is provided the opportunity to try and combine one or more of the given consumer's product and/or service orders with one or more other consumers' product and/or service orders, the given consumer is provided the terms of use for the process for providing a multiple party order coordination system and/or the rules governing the process for providing a multiple party order coordination system. In one embodiment, when the given consumer is provided the opportunity to try and combine one or more of the given consumer's product and/or service orders with one or more other consumers' product and/or service orders, the given consumer is asked to agree to all the terms of use and/or rules governing the process for providing a multiple party order coordination system in a binding legal agreement. In one embodiment, when the given consumer is provided the opportunity to try and combine one or more of the given consumer's product and/or service orders with one or more other consumers' product and/or service orders, the given consumer is asked to provide personal identification information and/or credit card information.

In one embodiment, the communication system whereby the multiple parties communicate, and/or negotiate, and/or coordinate, the merger/combination of their respective orders and establish one or more operating parameters is provided via a user interface displayed on a computing system and provided through process for providing a multiple party order coordination system. In one embodiment, the communication system is provided via a network, such as the Internet. In one embodiment, the communication system is provided via a web-page, web-site, and/or other web-based function, as discussed herein, and/or as known in the art at the time of filing, and/or as developed after the time of filing. In one embodiment, the communication system is provided via a computer program product as discussed herein, and/or as known in the art at the time of filing, and/or as developed after the time of filing. In one embodiment, the communication system is provided via instant messaging, and/or Internet, and/or server/web-based, communications systems. In one embodiment, the communication system is provided via e-mail addresses supplied through the process for providing a multiple party order coordination system. In one embodiment, the communication system is provided via phone numbers and/or mailing addresses provided through the process for providing a multiple party order coordination system.

In one embodiment, using the communication system, the multiple parties establish one or more operating parameters including, but not limited to: the party initiating the combined multiple party order; the items to be purchased; the minimum or maximum number of parties allowed to participate; the minimum purchased quantity for each party; the total minimum purchase quantity for the combined multiple party order; the order date; the delivery date; the delivery location; the payment method; the payment amount; and/or any other operating parameters deemed necessary by any of the multiple parties, the seller, and/or the provider of the process for providing a multiple party order coordination system.

In one embodiment, the communication system includes a calendar function for showing dates, and/or date windows, associated with the placement of the combined multiple party order and the delivery of the combined multiple party order. In one embodiment, the communication system includes a ratings and/or feedback system for rating and providing feedback regarding any, or all, of the multiple parties coming together through the process for providing a multiple party order coordination system and/or any of the sellers and/or products and/or services purchased through the process for providing a multiple party order coordination system.

In one embodiment, the communication system includes links to web-pages/web-sites associated with the sellers and/or products and/or services purchased through the process for providing a multiple party order coordination system. In other embodiments, the communication system includes any other features and/or sub-systems desired and/or deemed necessary by any of the multiple parties, the seller, and/or the provider of the process for providing a multiple party order coordination system.

In one embodiment, once the multiple parties communicate, and/or negotiate, and/or coordinate, the merger/combination of their respective orders and establish the one or more operating parameters using the communication system, the individual parties' orders are combined into a single combined multiple party order, typically large enough to qualify for a large order discount from the seller such as, but not limited to: tiered and/or volume pricing; explicit and/or effective shipping discounts; regular customer discounts; and/or to meet any minimum order requirements. In addition, in one embodiment, the individual parties' orders are combined into a single combined multiple party order in order to divide shipping cost among the parties so that each party effectively pays less shipping per unit. This strategy is particularly effective with flat rate shipping costs and/or seller shipping discounts.

In one embodiment, the combined multiple party order is placed through a purchase system provided by, or associated with, the process for providing a multiple party order coordination system. In various embodiments, the purchase system can be, but is not limited to: an electronic shopping cart provided by the seller and/or the process for providing a multiple party order coordination system; a system and/or template for creating and filling out an order form provided by the seller and/or the process for providing a multiple party order coordination system; a telephonic order system; and/or any other means, method, mechanism, process and/or procedure for placing a combined multiple party order, as discussed herein, and/or as known in the art at the time of filing, and/or as developed after the time of filing.

Using the process for providing a multiple party order coordination system disclosed herein, individual consumers can come together and coordinate their individual orders to avail themselves of large order discounts and/or for meeting minimum order requirements. Consequently, using the process for providing a multiple party order coordination system disclosed herein, not only do the individual consumers directly benefit, but the sellers also benefit by be given the opportunity to makes sales that might, absent the process for providing a multiple party order coordination system disclosed herein, never occur.

In addition, using the process for providing a multiple party order coordination system disclosed herein, small and/or local businesses are provided a powerful tool to come together with other small and/or local businesses, and/or individual consumers, and thereby obtain some of the volume discount advantages enjoyed by their "big box" competitors. Consequently, using the process for providing a multiple party order coordination system disclosed herein, these small and/or local businesses are provided the opportunity to potentially compete on a more "level playing field" and perhaps to survive as a healthy, and arguably necessary, competitive force in the overall market.

BRIEF DESCRIPTION OF THE DRAWINGS

FIG. 3 is an illustrative example of one particular combined multiple party order opportunity display in accordance with one embodiment; and FIG. 4 is an illustrative example of one particular multiple party communication display in accordance with one embodiment.

Figure 1:
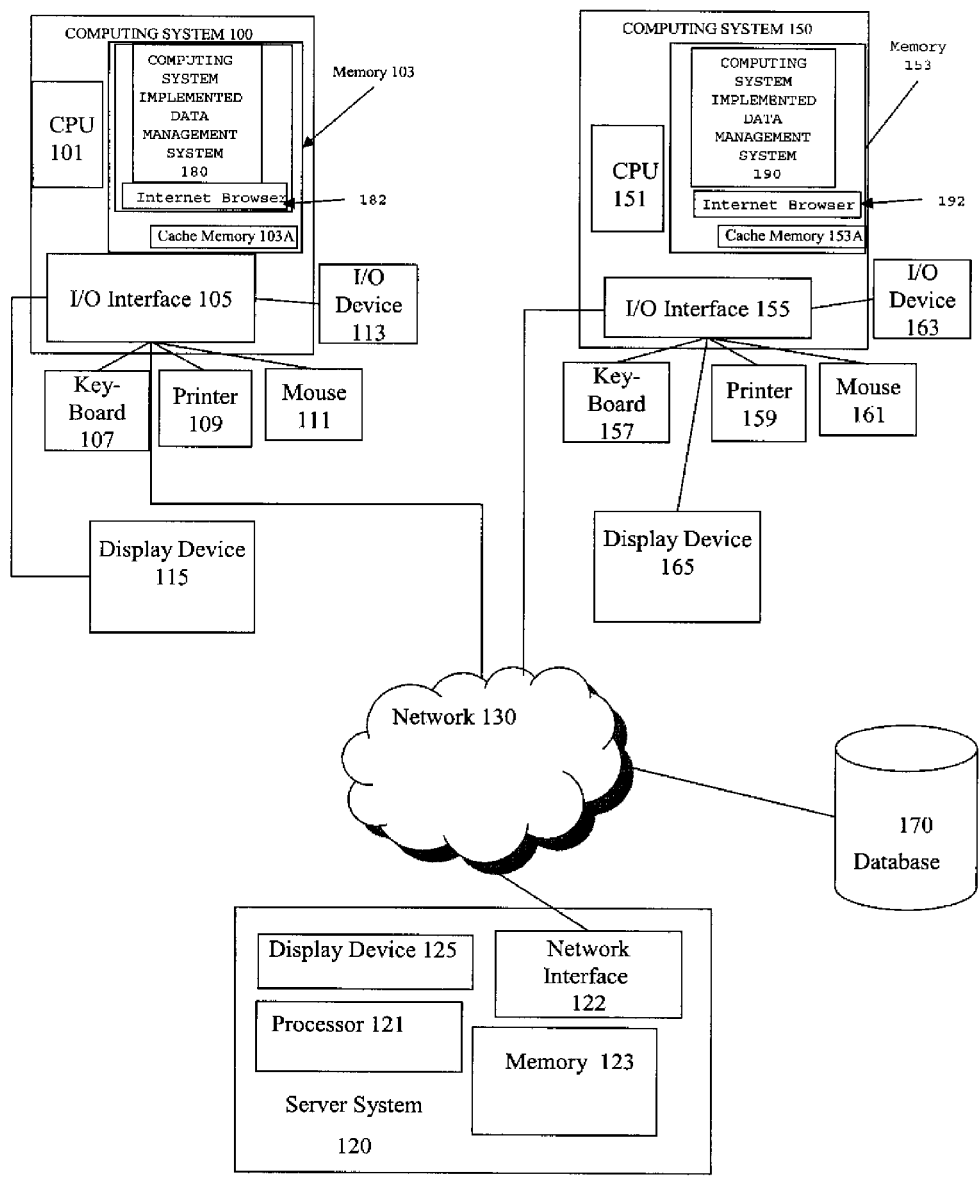
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for providing a multiple party order coordination system includes a process for providing a multiple party order coordination system whereby a given consumer, i.e., a first party, is provided the opportunity to try and combine one or more of the given consumer's product and/or service orders with one or more other consumers' product and/or service orders, i.e., with one or more other parties' product and/or service orders, into a combined multiple party order. In one embodiment, a communication system is provided whereby the multiple parties can communicate, and/or negotiate, and/or coordinate, the merger/combination of their respective orders and establish one or more operating parameters such as, but not limited to, purchase dates, delivery dates, delivery locations, purchase price, and payment method and timing. In one embodiment, the multiple parties' individual product and/or service orders are then merged into a single combined multiple party order. In one embodiment, the combined multiple party order is then placed through one or more purchase systems provided by, or otherwise associated with, the process for providing a multiple party order coordination system.

Hardware System Architecture

FIG. 1 is a block diagram of an exemplary hardware architecture for implementing one embodiment of a system and method for providing a multiple party order coordination system, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented data management system 180 such as any computing system implemented data management system discussed herein, and/or known in the art at the time of filing, and/or as developed thereafter. In one embodiment, computing system implemented data management system 180 is stored, in whole, or in part, in memory system 103, and is used by, or includes, or is accessed by, a process for providing a multiple party order coordination system (see FIG. 2, not shown in FIG. 1).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing a multiple party order coordination system and/or a computing system implemented data management system are entered, in whole, or in part, into computing system 100 via I/O device 113, such as from a CD, DVD, floppy disk, portable hard drive, memory stick, download site, or other medium and/or computer program product as discussed herein.

In one embodiment, computing system 100 also includes an Internet browser capability 182 that, in one embodiment, includes a search engine (not shown) and is stored, in whole, or in part in memory 103.

In one embodiment, order data representing one or more individual and/or combined multiple party orders (not shown) associated with one or more parties, is stored, in whole, or in part, in memory system 103, and is used by, or is accessed by, a process for providing a multiple party order coordination system. In one embodiment, computing system 100 is a user party computing system and/or initiating party computing system used, and/or accessible, by another computing system, such as computing system 150 (discussed below).

Computing system 100 can be any computing system as discussed herein and/or as known in the art at the time of filing and/or as developed thereafter, that includes components that can execute all, or part, of a process for providing a multiple party order coordination system, and/or a computing system implemented data management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented data management system 190, such as any computing system implemented data management system discussed herein, and/or known in the art at the time of filing, and/or as developed thereafter. In one embodiment, computing system implemented data management system 190 is stored, in whole, or in part, in memory system 153, and is used by, or includes, or is accessed by, a process for providing a multiple party order coordination system.

In one embodiment, order data representing one or more individual and/or combined multiple party orders associated with one or more parties, is stored, in whole, or in part, in memory system 153, and is used by, or is accessed by, a process for providing a multiple party order coordination system and/or one or more user parties. In one embodiment, computing system 150 is a computing system accessible by, and/or under the control of, the provider of the process for providing a multiple party order coordination system and/or the process for providing a multiple party order coordination system. In one embodiment, computing system 150 is used, and/or accessible, by another computing system, such as computing system 100.

Computing system 150 can be any computing system as discussed herein and/or as known in the art at the time of filing and/or as developed thereafter, that includes components that can execute all, or part, of a process for providing a multiple party order coordination system, and/or a computing system implemented data management system, in accordance with at least one of the embodiments as described herein.

As discussed in more detail below, in one embodiment, all, or part, of a process for providing a multiple party order coordination system, and/or a computing system implemented data management system, and/or order data representing one or more individual and/or combined multiple party orders associated with one or more parties, can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, and/or accessible by, a process for providing a multiple party order coordination system, and/or a computing system implemented data management system.

In one embodiment, order data representing one or more individual and/or combined multiple party orders associated with one or more parties, is stored, in whole, or in part, in database 170, and is used by, or is accessed by, a process for providing a multiple party order coordination system and/or one or more user parties. In one embodiment, database 170 is used, and/or accessible, by a computing system, such as computing systems 100 and/or 150, and/or a server system, such as sever system 120 (discussed below).

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, a communication system for providing communication between, and/or data representing contact information for, one or more parties, is stored, in whole, or in part, in server system 120, and is used by, or is accessed by, a process for providing a multiple party order coordination system.

In one embodiment, order data representing one or more individual and/or combined multiple party orders associated with one or more parties, is stored, in whole, or in part, in server system 120, and is used by, or is accessed by, a process for providing a multiple party order coordination system. In one embodiment, server system 120 is used, and/or accessible, by a computing system, such as computing systems 100 and/or 150, one or more user parties, and/or one or more databases, such as database 170.

Network 130 can be any network or network system as discussed herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for providing a multiple party order coordination system, and/or a computing system implemented data management system, and/or order data representing one or more individual and/or combined multiple party orders associated with one or more parties, is stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing a multiple party order coordination system, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing a multiple party order coordination system and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for providing a multiple party order coordination system, and/or a computing system implemented data management system, and/or order data representing one or more individual and/or combined multiple party orders associated with one or more consumers, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the term "party" and "consumer" and "user" and "user party" are used interchangeably to denote, any party, person, business, and/or entity for whom, or from whom, purchase order information is obtained by a process for providing a multiple party order coordination system and/or any party, person, business, and/or entity interacting with a process for providing a multiple party order coordination system for the purpose of potentially placing a combined multiple party order for a product and/or service, and/or a legal guardian of any party, person, business, and/or entity for whom, or from whom, purchase order information is obtained by a process for providing a multiple party order coordination system and/or a legal guardian of any party, person, business, and/or entity interacting with a process for providing a multiple party order coordination system for the purpose of potentially placing a combined multiple party order for a product and/or service, and/or an authorized agent of any party, person, business, and/or entity for whom, or from whom, purchase order information is obtained by a process for providing a multiple party order coordination system and/or an authorized agent of any party, person, business, and/or entity interacting with a process for providing a multiple party order coordination system for the purpose of potentially placing a combined multiple party order for a product and/or service.

As used herein, the term "product" and "product and/or service" and/or "service" are used interchangeably to denote a product, a service, or both a product and a service, or multiple products and/or services that can be purchased and/or or otherwise obtained by a consumer/party.

As used herein, the term computing system, denotes, but is not limited to: a portable computer; a workstation; a two-way pager; a cellular telephone; a smart phone; a digital wireless telephone; a Personal Digital Assistant (PDA); an MP3 Player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; MP3 Players and/or other music and/or video players; server computers; or any desired combination of these devices, that are coupled to perform the processes and/or operations as described herein.

As used herein, the term "computing system implemented data management system" includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic data management systems, packages, programs, modules, or applications, whether known at the time of filing or as developed later.

As used herein, the term "network" is used to denote any network or network system that is of interest such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to a data storage means that is part of, or under the control of, any computing system, as defined, known at the time of filing, or as developed thereafter.

In accordance with one embodiment, a system and method for providing a multiple party order coordination system includes a process for providing a multiple party order coordination system whereby a given consumer, i.e., a first party, is provided the opportunity to try and combine one or more of the given consumer's product and/or service orders with one or more other consumers' product and/or service orders, i.e., with one or more other parties' product and/or service orders, into a combined multiple party order. In one embodiment, a communication system is provided whereby the multiple parties can communicate, and/or negotiate, and/or coordinate, the merger/combination of their respective orders and establish one or more operating parameters such as, but not limited to, purchase dates, delivery dates, delivery locations, purchase price, and payment method and timing. In one embodiment, the multiple parties' individual product and/or service orders are then merged into a single combined multiple party order. In one embodiment, the combined multiple party order is then placed through one or more purchase systems provided by, or otherwise associated with, the process for providing a multiple party order coordination system.

Figure 2:
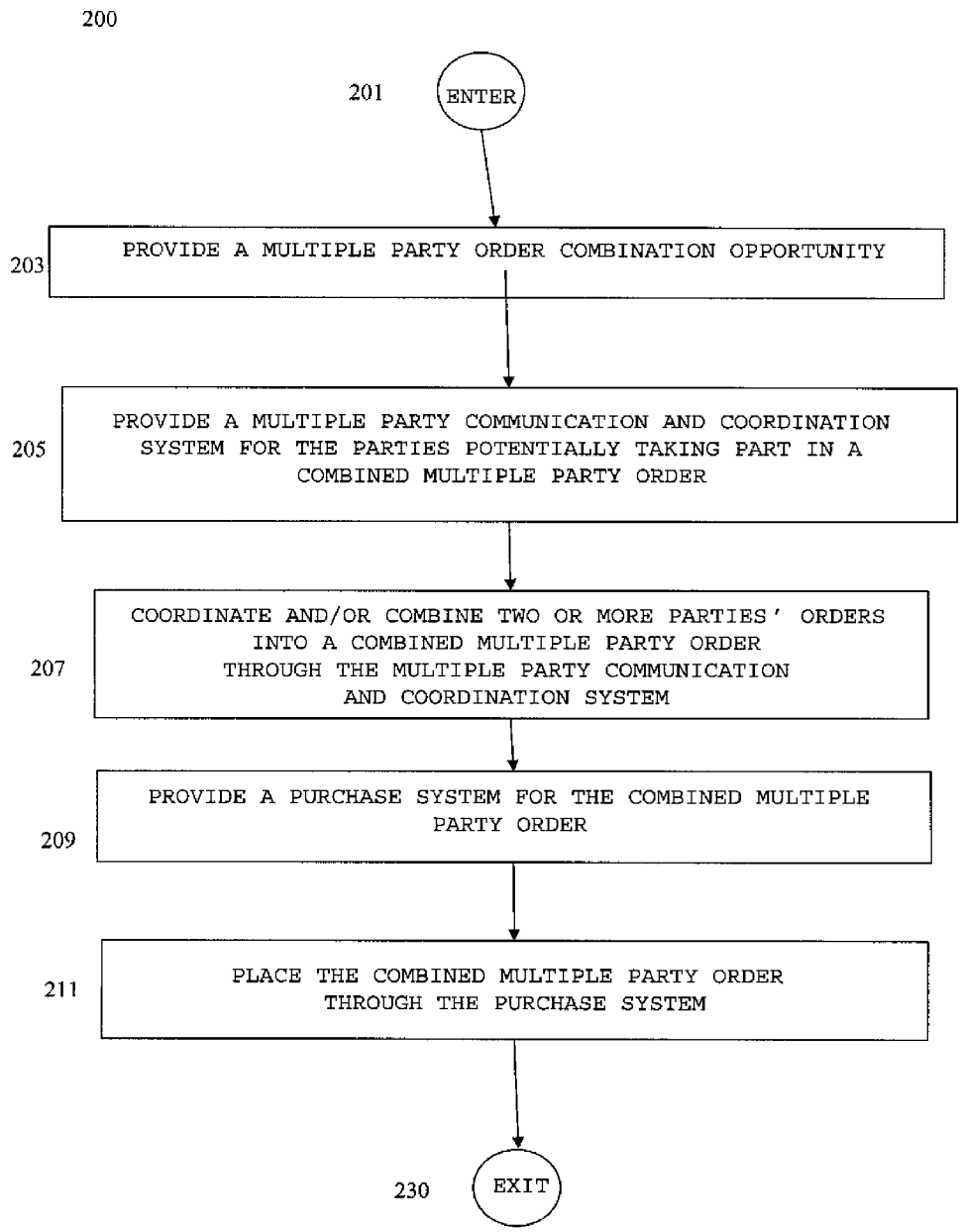
FIG. 2 is a flow chart depicting a process for providing a multiple party order coordination system in accordance with one embodiment.

FIG. 2 is a flow chart depicting a process for providing a multiple party order coordination system 200 in accordance with one embodiment. Process for providing a multiple party order coordination system 200 begins at ENTER OPERATION 201 of FIG. 2 and process flow proceeds to PROVIDE A MULTIPLE PARTY ORDER COMBINATION OPPORTUNITY OPERATION 203.

In one embodiment, at PROVIDE A MULTIPLE PARTY ORDER COMBINATION OPPORTUNITY OPERATION 203 a given consumer, i.e., one party, is provided the opportunity to try and combine one or more of the given consumer's product and/or service orders with one or more other consumers' product and/or service orders, i.e., with one or more other parties' product and/or service orders, into a combined multiple party order.

In one embodiment, process for providing a multiple party order coordination system 200 includes an interface such as, but not limited to, a web-based, or other Internet based, user interface display. In some of theses embodiments, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through process for providing a multiple party order coordination system 200.

In one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a database, such as database 170 of FIG. 1, associated with process for providing a multiple party order coordination system 200 (FIG. 2).

In one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a network, such as network 130 of FIG. 1, of computing systems, such as computing systems 100 and 150 of FIG. 1, associated with process for providing a multiple party order coordination system 200 (FIG. 2).

In one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a web-page and/or website associated with process for providing a multiple party order coordination system 200.

In one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a server system, such as server system 120 of FIG. 1, associated with process for providing a multiple party order coordination system 200 (FIG. 2).

In one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through an account associated with the given consumer and process for providing a multiple party order coordination system 200.

In one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a seller of the subject product and/or service.

In one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a database, such as database 170 of FIG. 1, associated a seller of the subject product and/or service.

Returning to FIG. 2, in one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a network, such as network 130 of FIG. 1, of computing systems, such as computing systems 100 and 150 of FIG. 1, associated with a seller of the subject product and/or service.

Returning to FIG. 2, in one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a web-page and/or website associated with a seller of the subject product and/or service.

Returning to FIG. 2, in one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a server system, such as server system 120 of FIG. 1, associated with a seller of the subject product and/or service.

Returning to FIG. 2, in one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through an account associated with the given consumer and a seller of the subject product and/or service.

Returning to FIG. 2, In one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a checkout feature and/or shopping cart and/or order purchase summary page associated with a seller of the subject product and/or service.

In one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through and/or from, a given community of consumers.

In one embodiment, the given community of consumers can be, but not limited to: consumers groups, such as consumer "watch-dog" groups, specialty consumer's groups, and/or club related consumer groups; users of a given multiple party order coordination system provided in accordance with one or more embodiments of a multiple party order coordination system 200; users of web-sites and/or services specifically designed around process for providing a multiple party order coordination system 200 to bring one or more consumers/parties together for making purchases and/or for achieving minimum order requires and/or qualifying from large order discounts; users of web-sites and/or services including process for providing a multiple party order coordination system 200 as a feature and/or component of the website and/or service, for example, potentially eBay or Amazon.com; a parent corporation or business entity, such as a large corporation having multiple divisions and/or offices/locations that wishes to combine orders from their multiple divisions and/or offices placed with a given seller to obtain volume and/or shipping discounts; an Internet based community, such as a community web-site; a business and/or trade association, such as a guild, trade union, etc.; a chamber of commerce, or other organization of multiple local businesses; or any other organization and/or community discussed herein, and/or known at the time of filing, and/or as developed after the time of filing. I In one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a database, such as database 170 of FIG. 1, associated a given community of consumers.

Returning to FIG. 2, in one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a network, such as network 130 of FIG. 1, of computing systems, such as computing systems 100 and 150 of FIG. 1, associated with a given community of consumers.

Returning to FIG. 2, in one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a web-page and/or website associated with a given community of consumers.

Returning to FIG. 2, in one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through a server system, such as server system 120 of FIG. 1, associated with a given community of consumers.

Returning to FIG. 2, in one embodiment, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through an account associated with the given consumer and a given community of consumers.

In other embodiments, at PROVIDE A MULTIPLE PARTY ORDER COMBINATION OPPORTUNITY OPERATION 203, the given consumer is provided the opportunity to try and combine one or more of the given consumer's product and/or service orders with one or more other consumers' product and/or service orders through any means, mechanism, process, and/or procedure for contacting and/or communicating with a given consumer, as discussed herein, and/or as known in the art at the time of filing, and/or as developed after the time of filing.

In one embodiment, at PROVIDE A MULTIPLE PARTY ORDER COMBINATION OPPORTUNITY OPERATION 203, the given consumer is also provided the terms of use for process for providing a multiple party order coordination system 200 and/or the rules governing users of process for providing a multiple party order coordination system 200. In one embodiment, at PROVIDE A MULTIPLE PARTY ORDER COMBINATION OPPORTUNITY OPERATION 203, the given consumer is also asked, and/or required, to agree to all the terms of use and/or rules governing process for providing a multiple party order coordination system 200 in a binding legal agreement. In one embodiment, at PROVIDE A MULTIPLE PARTY ORDER COMBINATION OPPORTU- NITY OPERATION 203, the given consumer is also asked to register, and/or provide personal identification information, and/or provide credit card information.

FIG. 3 shows one exemplary depiction of an interface display 300 whereby a given consumer is provided the opportunity to try and combine one or more of the given consumer's product and/or service orders with one or more other consumers' product and/or service orders such as would be provided to a given consumer, in one embodiment, at PROVIDE A MULTIPLE PARTY ORDER COMBINATION OPPORTUNITY OPERATION 203 (FIG. 2).

Returning to FIG. 3, interface display 300 is typical of an interface provided through a web-page and/or website associated with a seller of the subject product and/or service and/or as displayed as part of a checkout feature and/or shopping cart and/or order purchase summary page associated with a seller of the subject product and/or service. As seen in FIG. 3, interface display 300 includes: "ORDER SUMMARY" section 301, indicating the given party's order, shipping and tax costs as currently implemented; and "DISCOUNT NOTICE" section 303, where the given party is notified of a discount possibility and/or the given party is provided the opportunity to try and combine the displayed order with one or more other parties' product and/or service orders.

As also seen in FIG. 3, in this specific example, the given party is purchasing one dozen oysters for $16.00, but shipping is $36.00 and tax is $2.00, making the total cost $54.00, or $4.50 per oyster, including $3.00 per oyster for shipping. As also seen in FIG. 3, in this specific example, the given party is informed at DISCOUNT NOTICE section 303 that the shipping price is a flat rate for any number of orders up to 240. Consequently, for an order of 240 oysters, the cost per oyster drops from $4.50 per oyster, including $3.00 per oyster shipping, to $1.65 per oyster including only $0.15, i.e., 15 cents, per oyster for shipping, a savings of over 66% in total cost and 90% savings in shipping cost.

As shown in DISCOUNT NOTICE section 303 of FIG. 3 are "opt-in", i.e., "YES", and "opt-out", i.e., "NO", check boxes, including YES checkbox 305 shown as having been selected by the given party. In one embodiment, the party interacts with DISCOUNT NOTICE section 303, and/or interface 300, of FIG. 3 through a user interface device such as keyboard 107, 157, mouse 111, 161 of FIG. 1 or a touchpad, voice recognition system, or any other device capable of providing user input to a computing system and/or for translating user actions into computing system operations, whether available or known at the time of filing or as developed later.

Returning to FIG. 3, those of skill in the art will recognize that interface 300 and FIG. 3 are provided strictly for illustrative purposes and that numerous other types of interfaces are possible, each including different data, and different formats for displaying data. Consequently, interface 300 and FIG. 3 are representative only and do not limit the scope of the invention as claimed below.

Returning to FIG. 2, in one embodiment, once the given consumer is provided the opportunity to try and combine one or more of the given consumer's product and/or service orders with one or more other consumers' product and/or service orders at PROVIDE A MULTIPLE PARTY ORDER COMBINATION OPPORTUNITY OPERATION 203, data representing the given consumer's response, and/or data about the given consumer, and/or data associated with the one or more of the given consumer's product and/or service orders, is stored by, or under the control of, process for providing a multiple party order coordination system 200.

In one embodiment, the data is stored in whole, or in part, in a database maintained by, accessible by, owned by, or otherwise related to: process for providing a multiple party order coordination system 200, and/or a provider of process for providing a multiple party order coordination system 200; a computing system implemented data management system, and/or a provider of a computing system implemented data management system; a seller; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as discussed herein. In one embodiment, the data, in whole, or in part, is stored on a webpage, in a web-based system or on a public network such as the Internet.

Returning to FIG. 2, in some embodiments, the data stored as described above is maintained, in whole, or in part, by: process for providing a multiple party order coordination system 200, and/or a provider of process for providing a multiple party order coordination system 200; a computing system implemented data management system, and/or a provider of a computing system implemented data management system; a seller; a third party data storage institution; any third party service or institution; or any other parties. In one embodiment, access to the data is then provided to process for providing a multiple party order coordination system 200, and/or a computing system implemented data management system, by providing access to the data and/or providing the data on a computer program product.

Returning to FIG. 2, in one embodiment, once the given consumer is provided the opportunity to try and combine one or more of the given consumer's product and/or service orders with one or more other consumers' product and/or service orders at PROVIDE A MULTIPLE PARTY ORDER COMBINATION OPPORTUNITY OPERATION 203, process flow proceeds to PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205.

In one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205 a communication system is provided whereby the given consumer and the one or more other consumers', i.e., the multiple parties, can communicate, and/or negotiate, and/or coordinate, the merger/combination of their respective orders and establish one or more operating parameters such as, but not limited to, purchase dates, delivery dates, delivery locations, purchase price, and payment method and timing.

In one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205 the communication system whereby the multiple parties communicate, and/or negotiate, and/or coordinate, the merger/combination of their respective orders and establish one or more operating parameters is provided via a user interface displayed on a computing system, such as computing systems 100 and 150 of FIG. 1, and/or as discussed herein, and/or as known in the art at the time of filing, and/or as developed after the time of filing.

Returning to FIG. 2, in one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the communication system is provided via a network, such as network 130 of FIG. 1, and/or as discussed herein, and/or as known in the art at the time of filing, and/or as developed after the time of filing.

Returning to FIG. 2, in one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the communication system is provided via the Internet.

Returning to FIG. 2, in one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the communication system is provided via a web-page, web-site, and/or other web-based function, as discussed herein, and/or as known in the art at the time of filing, and/or as developed after the time of filing.

In one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the communication system is provided via a computer program product as discussed herein, and/or as known in the art at the time of filing, and/or as developed after the time of filing. In one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the communication system is provided via instant messaging, and/or any Internet based, and/or server/web-based, and/or application based communications systems.

In one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the communication system is provided via e-mail and/or e-mail addresses supplied through process for providing a multiple party order coordination system 200. In one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the communication system is provided via traditional, and/or cellular, phone service, and/or phone numbers provided through process for providing a multiple party order coordination system 200.

In one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the communication system is provided via text messaging. In one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the communication system is provided via a semi-private and/or private communication network associated with a website and/or application provided by, and/or otherwise associated with, process for providing a multiple party order coordination system 200.

In one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the communication system is provided via postal service and/or mailing addresses provided through process for providing a multiple party order coordination system 200.

In one embodiment, using the communication system of PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, the multiple parties establish one or more operating parameters. In one embodiment, the operating parameters include, but are not limited to: indicating and/or designating the party initiating, and/or setting the initial operational parameters of, the combined multiple party order; the items to be purchased through the combined multiple party order; the minimum or maximum number of parties allowed to participate; the minimum required quantity of an item each party must purchase through the combined multiple party order; the total minimum purchase quantity for the combined multiple party order; the order date and/or a cutoff date for a party to join the combined multiple party order; the delivery date for the items of the combined multiple party order; the delivery location of the items of the combined multiple party order; the payment method for each party associated with the combined multiple party order; the payment amount for each party associated with the combined multiple party order; the return policy associated with the combined multiple party order; any dispute resolution mechanism associated with the combined multiple party order; and/or any other operating parameters deemed necessary by any of the multiple parties, the seller, and/or the provider of process for providing a multiple party order coordination system 200.

In one embodiment, the communication system of PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205 includes a calendar function for showing dates, and/or date windows, associated with the placement of the combined multiple party order, the delivery of the combined multiple party order, and/or any of the operating parameters associated with the combined multiple party order.

In one embodiment, the communication system of PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205 includes a ratings and/or feedback system for rating and providing feedback regarding any one or more of, but not limited to: the multiple parties coming together through process for providing a multiple party order coordination system 200; any of the sellers of products and/or services purchased through process for providing a multiple party order coordination system 200; any products and/or services purchased through process for providing a multiple party order coordination system 200; or for any other party, component, and/or feature, associated with process for providing a multiple party order coordination system 200.

In one embodiment, the communication system of PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205 includes listings and/or hyper-links to web-pages/web-sites associated with the sellers and/or products and/or services purchased through process for providing a multiple party order coordination system 200.

In other embodiments, the communication system of PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205 includes any other features and/or sub-systems desired and/or deemed necessary by any of the multiple parties, the seller, and/or the provider of process for providing a multiple party order coordination system 200.

As noted above, in one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205 the communication system whereby the multiple parties communicate, and/or negotiate, and/or coordinate, the merger/combination of their respective orders and establish one or more operating parameters is provided via a user interface displayed on a computing system, such as computing systems 100 and 150 of FIG. 1, and/or as discussed herein, and/or as known in the art at the time of filing, and/or as developed after the time of filing.

FIG. 4 shows one exemplary depiction of an interface display 400 whereby the multiple parties communicate, and/or negotiate, and/or coordinate, the merger/combination of their respective orders and establish one or more operating parameters, such as would be provided to the multiple parties, in one embodiment, at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205 (FIG. 2).

Returning to FIG. 4, interface display 400 is typical of an interface provided through a web-page and/or website associated with a seller of the subject product and/or service and/or as displayed as part of a checkout feature and/or shopping cart and/or order purchase summary page associated with a seller of the subject product and/or service. As seen in FIG. 4, interface display 400 includes: "Initiating Party Information" section 401, indicating the initiating party's name, rating, and contact information; "Item Information" section 403, indicating the item to be purchased, the seller of the item, the price for the item, the shipping cost for the item, the total minimum number needed for the combined multiple party order acceptable to the initiating party, and the number of items committed to be purchased at present; "Delivery Information" section 405, including a date window for delivery acceptable to the initiating party, and the delivery location acceptable to the initiating party; and "Comments" section 407, As also seen in FIG. 4, and, in particular, in Initiating Party Information section 401, in this specific example: the initiating party is Savannah McKay; Ms. McKay has a rating of five stars, based on 201 reviews of Ms. McKay; and Ms. McKay can be contacted by e-mail.

As also seen in FIG. 4, and, in particular, in Item Information section 403, in this specific example: the item to be purchased is oysters; the seller is Pacific Oyster Company; the price for the oysters themselves is $16.00; the minimum number of oysters Ms. McKay is requesting is 240; the shipping price per oyster at the minimum order number indicated of 240 is $0.15 per oyster; and 12 oysters of the 240 needed are committed to be purchased so far.

As also seen in FIG. 4, and, in particular, in Delivery Information section 405, in this specific example: the order needs to be delivered between June 15 and June 30; and the delivery must be made with 5 miles of Monterey, Calif.

As also seen in FIG. 4, and, in particular, in Comments section 407, in this specific example, Ms. McKay has established a cut-off date of June 15, after which, the order will either be placed, if the minimum number has been committed to, of the order will be abandoned if the minimum number has not been achieved.

In one embodiment, the initiating party, i.e., Ms. McKay, and/or any other party, interacts with interface 400, of FIG. 4, through a user interface device such as keyboard 107, 157, mouse 111, 161 of FIG. 1 or a touchpad, voice recognition system, or any other device capable of providing user input to a computing system and/or for translating user actions into computing system operations, whether available or known at the time of filing or as developed later.

Returning to FIG. 4, those of skill in the art will recognize that interface 400 and FIG. 4 are provided strictly for illustrative purposes and that numerous other types of interfaces are possible, each including different data, and different formats for displaying data. Consequently, interface 400 and FIG. 4 are representative only and do not limit the scope of the invention as claimed below.

In one embodiment, once a communication system is provided whereby the given consumer and the one or more other consumers', i.e., the multiple parties, can communicate, and/or negotiate, and/or coordinate, the merger/combination of their respective orders and establish one or more operating parameters at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, data representing the proposed combined multiple party order of PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205 is stored by, or under the control of, process for providing a multiple party order coordination system 200.

In one embodiment, the data is stored in whole, or in part, in a database maintained by, accessible by, owned by, or otherwise related to: process for providing a multiple party order coordination system 200, and/or a provider of process for providing a multiple party order coordination system 200; a computing system implemented data management system, and/or a provider of a computing system implemented data management system; a seller; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as discussed herein. In one embodiment, the data, in whole, or in part, is stored on a webpage, in a web-based system or on a public network such as the Internet.

Returning to FIG. 2, in some embodiments, the data stored as described above is maintained, in whole, or in part, by: process for providing a multiple party order coordination system 200, and/or a provider of process for providing a multiple party order coordination system 200; a computing system implemented data management system, and/or a provider of a computing system implemented data management system; a seller; a third party data storage institution; any third party service or institution; or any other parties. In one embodiment, access to the data is then provided to process for providing a multiple party order coordination system 200, and/or a computing system implemented data management system, by providing access to the data and/or providing the data on a computer program product.

In one embodiment, once a communication system is provided whereby the given consumer and the one or more other consumers', i.e., the multiple parties, can communicate, and/or negotiate, and/or coordinate, the merger/combination of their respective orders and establish one or more operating parameters at PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205, process flow proceeds to COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207.

In one embodiment, at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207 the multiple parties' individual product and/or service orders are coordinated and merged into a single combined multiple party order.

In one embodiment, at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207 once the multiple parties communicate, and/or negotiate, and/or coordinate, the merger/combination of their respective orders and/or establish the one or more operating parameters using the communication system of PROVIDE A MULTIPLE PARTY COMMUNICATION AND COORDINATION SYSTEM FOR THE PARTIES POTENTIALLY TAKING PART IN A COMBINED MULTIPLE PARTY ORDER OPERATION 205 the individual parties' orders are combined into a single combined multiple party order.

In one embodiment, at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207, the individual parties' orders are combined into a single combined multiple party order specifically created to be large enough to qualify for a large order discount from the seller.

For instance, in one embodiment, at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207, the individual parties' orders are combined into a single combined multiple party order specifically created to be large enough to qualify for a tiered and/or volume pricing discount from the seller.

As another example, in one embodiment, at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207, the individual parties' orders are combined into a single combined multiple party order specifically created to be large enough to qualify for explicit and/or effective shipping discounts from the seller.

As another example, in one embodiment, at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207, the individual parties' orders are combined into a single combined multiple party order specifically created to be large enough to qualify for a regular customer discounts from the seller.

As another example, in one embodiment, at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207, the individual parties' orders are combined into a single combined multiple party order specifically created to be large enough to meet any minimum order requirements imposed by the seller.

As another example, in one embodiment, at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207, the individual parties' orders are combined into a single combined multiple party order specifically created to divide shipping cost among the parties so that each party effectively pays less shipping per unit. This strategy is particularly effective with flat rate shipping costs and/or seller shipping discounts and specialty items that require special handling and/or shipping considerations.

In other instances, at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207, the individual parties' orders are combined into a single combined multiple party order specifically created to be to meet any conditions imposed by, and/or discounts offered by, the seller.

In other instances, at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207, the individual parties' orders are combined into a single combined multiple party order for any reason, desire and/or demand, on the part of any of the parties, the seller, or process for providing a multiple party order coordination system 200.

In one embodiment, once the multiple parties' individual product and/or service orders are coordinated and merged into a single combined multiple party order at COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207, process flow process to PROVIDE A PURCHASE SYSTEM FOR THE COMBINED MULTIPLE PARTY ORDER OPERATION 209.

In one embodiment, at PROVIDE A PURCHASE SYSTEM FOR THE COMBINED MULTIPLE PARTY ORDER OPERATION 209, a purchase system is provided by, or associated with, process for providing a multiple party order coordination system 200.

In one embodiment, the purchase system provided by, or associated with, process for providing a multiple party order coordination system 200 at PROVIDE A PURCHASE SYSTEM FOR THE COMBINED MULTIPLE PARTY ORDER OPERATION 209, is an electronic shopping cart and/or checkout system provided by the seller and/or process for providing a multiple party order coordination system 200.

In one embodiment, the purchase system provided by, or associated with, process for providing a multiple party order coordination system 200 at PROVIDE A PURCHASE SYSTEM FOR THE COMBINED MULTIPLE PARTY ORDER OPERATION 209, is a system and/or template for creating and filling out an order form provided by the seller and/or process for providing a multiple party order coordination system 200.

In one embodiment, the purchase system provided by, or associated with, process for providing a multiple party order coordination system 200 at PROVIDE A PURCHASE SYSTEM FOR THE COMBINED MULTIPLE PARTY ORDER OPERATION 209, is one or more persons, or entities, tasked with creating and/or filling out an order form provided by the seller and/or process for providing a multiple party order coordination system 200.

In one embodiment, the purchase system provided by, or associated with, process for providing a multiple party order coordination system 200 at PROVIDE A PURCHASE SYSTEM FOR THE COMBINED MULTIPLE PARTY ORDER OPERATION 209, is a telephonic ordering system.

In one embodiment, the purchase system provided by, or associated with, process for providing a multiple party order coordination system 200 at PROVIDE A PURCHASE SYSTEM FOR THE COMBINED MULTIPLE PARTY ORDER OPERATION 209, is one or more persons, or entities, tasked with placing the combined multiple party order through a telephonic ordering system provided by the seller and/or process for providing a multiple party order coordination system 200.

In one embodiment, the purchase system provided by, or associated with, process for providing a multiple party order coordination system 200 at PROVIDE A PURCHASE SYSTEM FOR THE COMBINED MULTIPLE PARTY ORDER OPERATION 209, is any other means, method, mechanism, process and/or procedure for placing a combined multiple party order, as discussed herein, and/or as known in the art at the time of filing, and/or as developed after the time of filing.

In one embodiment, once a purchase system is provided by, or associated with, process for providing a multiple party order coordination system 200 at PROVIDE A PURCHASE SYSTEM FOR THE COMBINED MULTIPLE PARTY ORDER OPERATION 209, process flow proceeds to PLACE THE COMBINED MULTIPLE ORDER THROUGH THE PURCHASE SYSTEM OPERATION 211.

In one embodiment, at PLACE THE COMBINED MULTIPLE ORDER THROUGH THE PURCHASE SYSTEM OPERATION 211 the combined multiple party order of COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207 is placed through one or more purchase systems provided by, or otherwise associated with, process for providing a multiple party order coordination system 200 of PROVIDE A PURCHASE SYSTEM FOR THE COMBINED MULTIPLE PARTY ORDER OPERATION 209.

In one embodiment, once the combined multiple party order of COORDINATE AND/OR COMBINE TWO OR MORE PARTIES' ORDERS INTO A COMBINED MULTIPLE PARTY ORDER THROUGH THE MULTIPLE PARTY COMMUNICATION AND COORDINATION SYSTEM OPERATION 207 is placed through one or more purchase systems provided by, or otherwise associated with, process for providing a multiple party order coordination system 200 of PROVIDE A PURCHASE SYSTEM FOR THE COMBINED MULTIPLE PARTY ORDER OPERATION 209 at PLACE THE COMBINED MULTIPLE ORDER THROUGH THE PURCHASE SYSTEM OPERATION 211, process flow proceeds to EXIT OPERATION 230.

In one embodiment, at EXIT OPERATION 230, process for providing a multiple party order coordination system 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing a multiple party order coordination system 200, individual consumers can come together and coordinate their individual orders to avail themselves of large order discounts and/or for meeting minimum order requirements. Consequently, using process for providing a multiple party order coordination system 200, not only do the individual consumers directly benefit, but the sellers also benefit by be given the opportunity to makes sales that might, absent process for providing a multiple party order coordination system 200, never occur.

In addition, using process for providing a multiple party order coordination system 200, small and/or local businesses are provided a powerful tool to come together with other small and/or local businesses, and/or individual consumers, and thereby obtain some of the volume purchaser advantages enjoyed by their "big box" competitors. Consequently, using process for providing a multiple party order coordination system 200, these small and/or local businesses are provided the opportunity to potentially compete on a more "level playing field" and perhaps to survive as a healthy, and arguably necessary, competitive force in the overall market.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing", "analyzing", "obtaining", "determining", "collecting", "placing", "transferring", "storing", "searching", "coordinating", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored via a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for providing a multiple party order coordination system comprising:
   providing an order purchase system, the order purchase system being operated and under the control of a vendor;
   providing, prior to order placement of a first party's order being completed, through a checkout feature of a final order checkout screen associated with the first party's purchase of a product, the final order purchase checkout screen being of the order purchase system, the first party an opportunity to combine the first party's order for one or more of a product or service with one or more other parties' already placed orders for the one or more of a product or service to qualify for a large order discount or other discount;
   providing, upon selecting the checkout feature, a communication system for the first party and the one or more other parties;
   using the communication system, the first party and the one or more other parties coordinate with each other to combine the first party's order for the one or more of a product or service with at least one of the one or more other parties' already placed orders for the one or more of a product or service into a single multiple party order; and
   placing the single multiple party order using the order purchase system.

2. The computing system implemented process for providing a multiple party order coordination system of claim 1, wherein;
the first party is provided the opportunity to combine the first party's order for the one or more of a product or service with the one or more other parties' orders for the one or more of a product or service by the process for providing a multiple party order coordination system.

3. The computing system implemented process for providing a multiple party order coordination system of claim 1, wherein;
the first party is provided the opportunity to combine the first party's order for the one or more of a product or service with the one or more other parties' orders for the one or more of a product or service by a seller of a product or service that is the subject of at least one of the first party's order for the one or more of a product or service and one or more other parties' orders for the one or more of a product or service.

4. The computing system implemented process for providing a multiple party order coordination system of claim 1, wherein;
the first party is provided the opportunity to combine the first party's order for the one or more of a product or service with the one or more other parties' orders for the one or more of a product or service through a given community of consumers.

5. The computing system implemented process for providing a multiple party order coordination system of claim 4, wherein;
the given community of consumers is selected from at least one of the group of community of consumers consisting of:
a consumer group;
users of web-sites and/or services specifically designed around a process for providing a multiple party order coordination system to bring one or more parties together for making purchases;
users of web-sites and/or services including a process for providing a multiple party order coordination system as a feature and/or component of the website and/or service;
a corporate or business entity;
an Internet based community;
a business and/or trade association;
a chamber of commerce;
a social organization; and
a regional organization.

6. The computing system implemented process for providing a multiple party order coordination system of claim 1, wherein;
the first party is provided the opportunity to combine the first party's order for the one or more of a product or service with the one or more other parties' orders for the one or more of a product or service through a communication media selected from at least one of the group of communication media consisting of:
a computing system;
a network of computing systems;
the Internet;
a website associated with a seller;
a shopping cart function associated with a seller;
a database associated with a seller;
a website associated with the process for providing a multiple party order coordination system;
a database associated with the process for providing a multiple party order coordination system;
a website associated with a given community of consumers; and
a database associated with a given community of consumers.

7. The computing system implemented process for providing a multiple party order coordination system of claim 1, wherein;
as part of the first party being provided the opportunity to combine the first party's order for the one or more of a product or service with the one or more other parties' orders for the one or more of a product or service, the first party is requested to agree to terms of use associated with the process for providing a multiple party order coordination system.

8. The computing system implemented process for providing a multiple party order coordination system of claim 1, wherein;
the communication system for the first party and the one or more other parties' is used by the first party and the one or more other parties' to communicate and coordinate the combination of their respective orders.

9. The computing system implemented process for providing a multiple party order coordination system of claim 1, wherein;
the communication system for the first party and the one or more other parties' is selected from at least one of the group of communication systems consisting of:
the Internet;
a website;
a database;
an instant messaging system;
e-mail;
a network of computing systems;
a telephone system; and
traditional postal service.

10. The computing system implemented process for providing a multiple party order coordination system of claim 1, wherein;
the communication system for the first party and the one or more other parties' is used by the first party and the one or more other parties' to communicate and coordinate the combination of their respective orders and to establish one or more operating parameters.

11. The computing system implemented process for providing a multiple party order coordination system of claim 10, wherein;
the system is configured to consider the following operating parameters:
the party initiating the single multiple party order;
the items to be purchased;
the minimum purchased quantity for each party;
the total minimum purchase quantity for the single multiple party order;
the order date;
the delivery date;
the delivery location;
the payment method;
a minimum number of participant parties required;
a maximum number of participant parties allowed; and
the payment amount.

12. The computing system implemented process for providing a multiple party order coordination system of claim 1, wherein;
the communication system comprises a calendar function.

13. The computing system implemented process for providing a multiple party order coordination system of claim 1, wherein;
the communication system comprises a ratings system.

14. The computing system implemented process for providing a multiple party order coordination system of claim 1, wherein;
a size of the single multiple party order is chosen such that the single multiple party order meets minimum order requirements imposed by a seller of a product or service that is the subject of the at least one of the first party's order for the one or more of a product or service and one or more other parties' orders for the one or more of a product or service.

15. The computing system implemented process for providing a multiple party order coordination system of claim 1, wherein;
a size of the single multiple party order is chosen such that the single multiple party order meets threshold order size requirements imposed by a seller to qualify for the large order discount.

16. The computing system implemented process for providing a multiple party order coordination system of claim 15, wherein;
the large order discount is selected from at least one of the group of large order discounts consisting of:
a tiered pricing discount;
a volume pricing discount;
an explicit shipping discount;
an effective shipping discount;
a flat rate shipping discount; and
a regular customer discount.

17. A computer program product for providing a process for providing a multiple party order coordination system comprising:
a non-transitory computer readable medium;
and computer program code, encoded on the computer readable medium, comprising computer readable instructions which when executed by a processor, perform a process for:
providing an order purchase system, the order purchase system being operated and under the control of a vendor;
providing, prior to order placement of a first party's order being completed, through a checkout feature of a final order checkout screen associated with the first party's purchase of a product, the final order purchase checkout screen being of the order purchase system, the first party an opportunity to combine the first party's order for one or more of a product or service with one or more other parties' already placed orders for the one or more of a product or service to qualify for a large order discount or other discount;
providing, upon selecting the checkout feature, a communication system for the first party and the one or more other parties;
using the communication system, the first party and the one or more other parties coordinate with each other to combine the first party's order for the one or more of a product or service with at least one of the one or more other parties' already placed orders for the one or more of a product or service into a single multiple party order; and
placing the single multiple party order using the order purchase system.

18. The computer program product for providing a process for providing a multiple party order coordination system of claim 17, wherein;
the first party is provided the opportunity to combine the first party's order for the one or more of a product or service with the one or more other parties' orders for the one or more of a product or service by the process for providing a multiple party order coordination system.

19. The computer program product for providing a process for providing a multiple party order coordination system of claim 17, wherein;
the first party is provided the opportunity to combine the first party's order for the one or more of a product or service with the one or more other parties' orders for the one or more of a product or service by a seller of a product or service that is the subject of at least one of the first party's order for the one or more of a product or service and one or more other parties' orders for the one or more of a product or service.

20. The computer program product for providing a process for providing a multiple party order coordination system of claim 17, wherein;
the first party is provided the opportunity to combine the first party's order for the one or more of a product or service with the one or more other parties' orders for the one or more of a product or service through a given community of consumers.

21. The computer program product for providing a process for providing a multiple party order coordination system of claim 20, wherein;
the given community of consumers is selected from at least one of the group of community of consumers consisting of:
a consumer group;
users of web-sites and/or services specifically designed around a process for providing a multiple party order coordination system to bring one or more parties together for making purchases;
users of web-sites and/or services including a process for providing a multiple party order coordination system as a feature and/or component of the website and/or service;
a corporate or business entity;
an Internet based community;
a business and/or trade association;
a chamber of commerce;
a social organization; and
a regional organization.

22. The computer program product for providing a process for providing a multiple party order coordination system of claim 17, wherein;
the first party is provided the opportunity to combine the first party's order for the one or more of a product or service with the one or more other parties' orders for the one or more of a product or service through a communication media selected from at least one of the group of communication media consisting of:
a computing system;
a network of computing systems;
the Internet;
a website associated with a seller;
a shopping cart function associated with a seller;
a database associated with a seller;
a website associated with the process for providing a multiple party order coordination system;
a database associated with the process for providing a multiple party order coordination system;

a website associated with a given community of consumers; and a database associated with a given community of consumers.

23. The computer program product for providing a process for providing a multiple party order coordination system of claim 17, wherein;
as part of the first party being provided the opportunity to combine the first party's order for the one or more of a product or service with the one or more other parties' orders for the one or more of a product or service, the first party is requested to agree to terms of use associated with the process for providing a multiple party order coordination system.

24. The computer program product for providing a process for providing a multiple party order coordination system of claim 17, wherein;
the communication system for the first party and the one or more other parties' is used by the first party and the one or more other parties' to communicate and coordinate the combination of their respective orders.

25. The computer program product for providing a process for providing a multiple party order coordination system of claim 17, wherein;
the communication system for the first party and the one or more other parties' is selected from at least one of the group of communication systems consisting of:
the Internet;
a website;
a database;
an instant messaging system;
e-mail;
a network of computing systems;
a telephone system; and
traditional postal service.

26. The computer program product for providing a process for providing a multiple party order coordination system of claim 17, wherein;
the communication system for the first party and the one or more other parties' is used by the first party and the one or more other parties' to communicate and coordinate the combination of their respective orders and to establish one or more operating parameters.

27. The computer program product for providing a process for providing a multiple party order coordination system of claim 26, wherein;
the system is configured to consider the following operating parameters:
the party initiating the single multiple party order;
the items to be purchased;
the minimum purchased quantity for each party;
the total minimum purchase quantity for the single multiple party order;
the order date;
the delivery date;
the delivery location;
a minimum number of participant parties required;
a maximum number of participant parties allowed;
the payment method; and
the payment amount.

28. The computer program product for providing a process for providing a multiple party order coordination system of claim 17, wherein;
the communication system comprises a calendar function.

29. The computer program product for providing a process for providing a multiple party order coordination system of claim 17, wherein;
the communication system comprises a ratings system.

30. The computer program product for providing a process for providing a multiple party order coordination system of claim 17, wherein;
a size of the single multiple party order is chosen such that the single multiple party order meets minimum order requirements imposed by a seller of a product or service that is the subject of the at least one of the first party's order for the one or more of a product or service and one or more other parties' orders for the one or more of a product or service.

31. The computer program product for providing a process for providing a multiple party order coordination system of claim 17, wherein;
a size of the single multiple party order is chosen such that the single multiple party order meets threshold order size requirements imposed by a seller to qualify for the large order discount.

32. The computer program product for providing a process for providing a multiple party order coordination system of claim 31, wherein;
the large order discount is selected from at least one of the group of large order discounts consisting of:
a tiered pricing discount;
a volume pricing discount;
an explicit shipping discount;
an effective shipping discount;
a flat rate shipping discount; and
a regular customer discount.

* * * * *